United States Patent

[11] 3,585,524

[72] Inventor William T. Silfvast
Holmdel Township, Monmouth County, N.J.
[21] Appl. No. 819,859
[22] Filed Apr. 28, 1969
[45] Patented June 15, 1971
[73] Assignee Bell Telephone Laboratories Incorporated
Murray Hill, Berkeley Heights, N.J.
Continuation-in-part of application Ser. No. 759,922, Sept. 16, 1968, now abandoned.

[54] ION LASERS EMPLOYING GAS MIXTURES
10 Claims, 7 Drawing Figs.
[52] U.S. Cl. .................................. 331/94.5
[51] Int. Cl. ................................... H01s 3/09, H01s 3/22
[50] Field of Search ........................ 331/94.5

[56] References Cited
UNITED STATES PATENTS
3,388,314   6/1968   Gould .................. 331/94.5 X OTHER REFERENCES
Vogel, " High-Frequency Optical Phonon Masing Reported," ELECTRONICS Jan. 4, 1963, pp. 102— 3.
Howard, Jr., " Resonant Energy Transfer from Mercury to Zinc in Relation to a Gas Laser." U.S. GOVT. RES. R'P'RT AD603680 (AFIT THESIS) U.S. GOVT. PRINTING OFC. Wash. D.C. Aug. 1964, pp. 1, 3, 4, 25— 27, 42, 44— 47 and title page
Bridges et al., " Spectroscopy of Ion Lasers," IEEE J. Quont ELECTRONICS. QE-1, May 1965 pp. 66— 84
Fowles & Silfvast, " High Gain Laser Transition in Lead Vapor," APPL. PHYS. LETT. 6, (12), 15 June 1965 pp. 236-—7
Cooper & Cheo, " Laser Transitions in BlI, BrII and Sn" IEEE J. Quont ELECTRONICS QE-2, Dec. 1965, p 785
Silfvast et al., " Laser Action in Singly Ionized Ge, Sn, Pb, In, Cd and Zn," APPL. PHYS. LETT. 8, (12), 15 June 1966, pp. 318— 19.

Primary Examiner—Ronald L. Wibert
Assistant Examiner—R. J. Webster
Attorneys—R. J. Guenther and Arthur J. Torsiglieri ABSTRACT: Ion lasers are disclosed which employ active media comprising ionized vapors of cadmium, zinc, magnesium, aluminum, gallium, indium, thallium, beryllium, germanium, tin or lead in each case excited to the upper laser state by a nonresonant interaction with helium or neon metastable atoms. The excess energy of the metastable atom in the nonresonant interaction is carried off by a free electron; and lasing action occurs in the singly ionized metallic vapor. Continuous-wave lasing action based on this principle has been observed at 325 mm. in the ultraviolet in singly ionized cadmium, at 645.3 nm. and 684.4 nm. in the visible in singly ionized tin, and at 747.9 nm. in the infrared in singly ionized zinc.

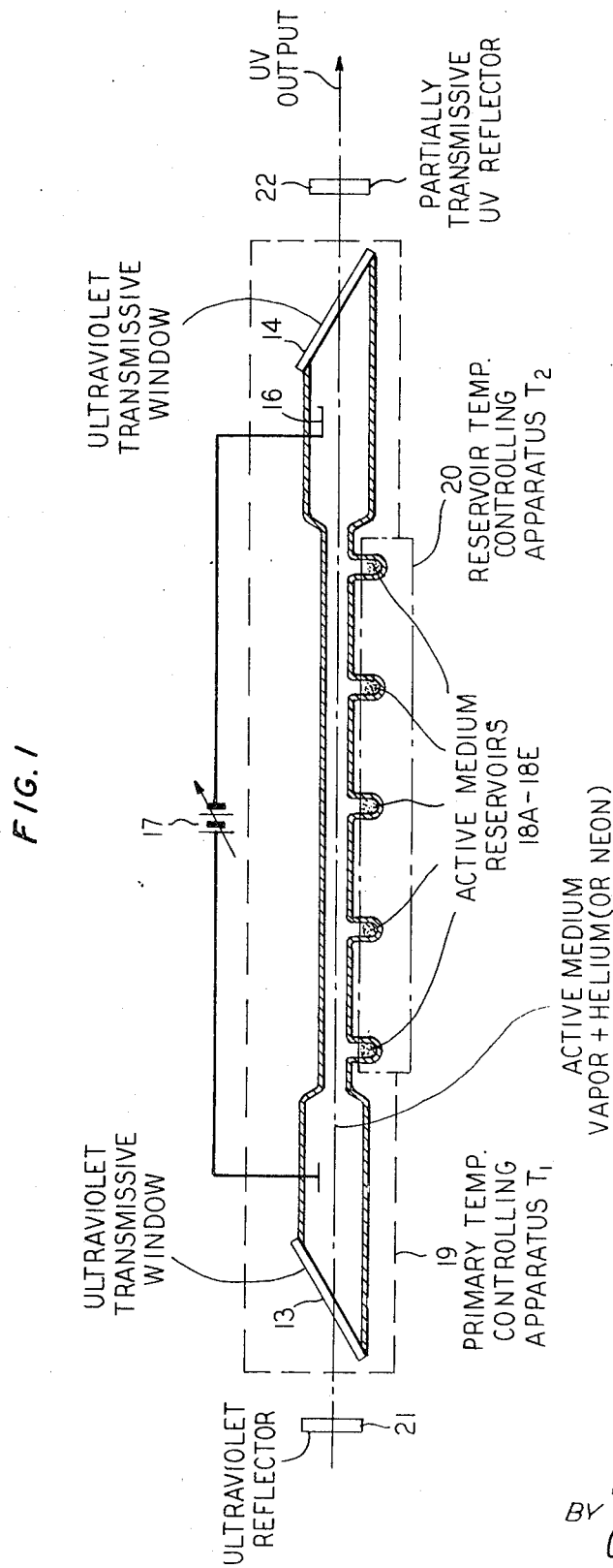

FIG. 2A

| ACTIVE MEDIUM AND TEMPERATURE | ION LASER TRANSITION PUMPED BY HELIUM METASTABLE | $\lambda$ |
|---|---|---|
| CADMIUM, Cd II 150°C-320°C | * 5d $^2D_{3/2}$ → 5p $^2P^0_{1/2}$ | 219.4 nm |
| | * 5d $^2D_{5/2}$ → 5p $^2P^0_{3/2}$ | 231.2 |
| | 6s $^2S_{1/2}$ → 5p $^2P^0_{3/2}$ | 257.2 |
| | 6s $^2S_{1/2}$ → 5p $^2P^0_{3/2}$ | 274.8 |
| | 5s$^2$ $^2D_{3/2}$ → 5p $^2P^0_{1/2}$ | 325.0 |
| ZINC, Zn II 200°C-400°C | * 5s $^2S_{1/2}$ → 4p $^2P^0_{1/2}$ | 250.2 |
| | * 5s $^2S_{1/2}$ → 4p $^2P^0_{3/2}$ | 255.8 |
| | 4s$^2$ $^2D_{3/2}$ → 4p $^2P^0_{1/2}$ | 589.4 |
| | 4s$^2$ $^2D_{3/2}$ → 4p $^2P^0_{3/2}$ | 621.4 |
| | 4s$^2$ $^2D_{5/2}$ → 4p $^2P^0_{3/2}$ | 747.9 |
| MAGNESIUM, Mg II 300°C-500°C | ★ 3d $^2D_{5/2}$ → 3p $^2P^0_{1/2}$ | 279.0 |
| | ★ 3d $^2D_{3/2}$ → 3p $^2P^0_{3/2}$ | 279.8 |
| | ★ 4s $^2S_{1/2}$ → 3p $^2P^0_{1/2}$ | 292.8 |
| | ★ 4s $^2S_{1/2}$ → 3p $^2P^0_{3/2}$ | 293.6 |
| ALUMINUM, Al II 850°C-1300°C | 3d $^1D_2$ → 3p $^1P^0_1$ | 198.9 |
| | 4s $^1S_0$ → 3p $^1P^0_1$ | 281.6 |
| | ★ 3p$^2$ $^1D_2$ → 3p $^1P^0_1$ | 390.0 |
| GALLIUM, Ga II 750°C-1200°C | 4d $^1D_2$ → 4p $P^0_1$ | 270.0 |
| | 5s $^1S_0$ → 4p $P^0_1$ | 278.0 |
| INDIUM, In II 700°C-1100°C | 5d $^1D_2$ → 5p $^1P^0_1$ | 196.6 |
| | 6s $^1S_0$ → 5p $^1P^0_1$ | 294.1 |

\* INDICATES $^1S_0$ He METASTABLE ONLY
★ REACTION MAY ALSO OCCUR WITH Ne METASTABLE

FIG. 2B

| ACTIVE MEDIUM | ION LASER TRANSITION PUMPED BY HELIUM METASTABLE | | $\lambda$ |
|---|---|---|---|
| THALLIUM, Tl II 400°C-700°C | ✱ 6d $^1D_2$ ⟶ | 6p $^1P_1^0$ | 253.0nm |
| | 7s $^1S_0$ ⟶ | 6p $^1P_1^0$ | 309.1 |
| BERYLLIUM, Be II 900°C-1300°C | ✱ 3s $^2S_{1/2}$ ⟶ | 2p $^2P_{1/2}^0$ | 177.61 |
| | ✱ 3s $^2S_{1/2}$ ⟶ | 2p $^2P_{3/2}^0$ | 177.63 |
| GERMANIUM, Ge II 1000°C-1500°C | 6s $^2S_{1/2}$ ⟶ | 5p $^2P_{3/2}^0$ | 648.4 |
| | 6s $^2S_{1/2}$ ⟶ | 5p $^2P_{1/2}^0$ | 633.6 |
| | ✱ 5p $^2P_{1/2}^0$ ⟶ | 5s $^2S_{1/2}$ | 602.1 |
| | ✱ 5p $^2P_{3/2}^0$ ⟶ | 5s $^2S_{1/2}$ | 589.3 |
| | ✱ 4f $^2F_{7/2}^0$ ⟶ | 4d $^2D_{5/2}$ | 517.9 |
| | ✱ 4f $^2F_{5/2}^0$ ⟶ | 4d $^2D_{5/2}$ | 517.86 |
| | ✱ 4f $^2F_{5/2}^0$ ⟶ | 4d $^2D_{3/2}$ | 513.1 |
| TIN, Sn II 900°C-1350°C | 7s $^2S_{1/2}$ ⟶ | 6p $^2P_{3/2}^0$ | 719.1 |
| | ★ 6p $^2P_{3/2}^0$ ⟶ | 6s $^2S_{1/2}$ | 684.4 |
| | 7s $^2S_{1/2}$ ⟶ | 6p $^2P_{1/2}^0$ | 676.1 |
| | ★ 6p $^2P_{3/2}^0$ ⟶ | 6s $^2S_{1/2}$ | 645.3 |
| | 4f $^2F_{7/2}^0$ ⟶ | 5d $^2D_{5/2}$ | 579.9 |
| | 4f $^2F_{5/2}^0$ ⟶ | 5d $^2D_{5/2}$ | 579.7 |
| | 6d $^2D_{3/2}$ ⟶ | 6p $^2P_{3/2}^0$ | 559.6 |
| | 4f $^2F_{5/2}^0$ ⟶ | 5d $^2D_{3/2}$ | 558.8 |
| | 6d $^2D_{5/2}$ ⟶ | 6p $^2P_{3/2}^0$ | 556.1 |
| | 6d $^2D_{3/2}$ ⟶ | 6p $^2P_{1/2}^0$ | 533.2 |

✱ INDICATES $^1S_0$ He METASTABLE ONLY
★ REACTION MAY ALSO OCCUR WITH Ne METASTABLE

FIG. 2C

| ACTIVE MEDIUM | ION LASER TRANSITION PUMPED BY HELIUM METASTABLE | $\lambda$ |
|---|---|---|
| | $8s\ ^2S_{1/2} \longrightarrow 6p\ ^2P^0_{3/2}$ | 384.1nm |
| | $8s\ ^2S_{1/2} \longrightarrow 6p\ ^2P^0_{1/2}$ | 371.5 |
| | $5f\ ^2F^0_{7/2} \longrightarrow 5d\ ^2D_{5/2}$ | 362.05 |
| | $5f\ ^2F^0_{5/2} \longrightarrow 5d\ ^2D_{5/2}$ | 362.00 |
| | $7d\ ^2D_{3/2} \longrightarrow 6p\ ^2P^0_{3/2}$ | 358.2 |
| | $7d\ ^2D_{5/2} \longrightarrow 6p\ ^2P^0_{3/2}$ | 357.5 |
| | $8p\ ^2P^0_{3/2} \longrightarrow 5d\ ^2D_{5/2}$ | 340.7 |
| | $8p\ ^2P^0_{1/2} \longrightarrow 5d\ ^2D_{3/2}$ | 335.5 |
| | $4f\ ^2F^0_{7/2} \longrightarrow 5p^2\ ^2D_{5/2}$ | 335.1 |
| | $4f\ ^2F^0_{5/2} \longrightarrow 5p^2\ ^2D_{3/2}$ | 328.3 |
| | $5f\ ^2F^0_{7/2} \longrightarrow 5p^2\ ^2D_{5/2}$ | 248.6 |
| | $5f\ ^2F^0_{5/2} \longrightarrow 5p^2\ ^2D_{3/2}$ | 244.8 |
| | $8p\ ^2P^0_{3/2} \longrightarrow 5p^2\ ^2D_{5/2}$ | 238.4 |
| | $8p\ ^2P^0_{1/2} \longrightarrow 5p^2\ ^2D_{3/2}$ | 236.0 |
| LEAD, Pb II 500°C-850°C | $8s\ ^2S_{1/2} \longrightarrow 7p\ ^2P^0_{3/2}$ | 839.5 |
| | $8p\ ^2P^0_{1/2} \longrightarrow 6p^2\ ^2D_{3/2}$ | 833.5 |
| | * $6f\ ^2F^0_{7/2} \longrightarrow 6p^2\ ^2D_{5/2}$ | 719.3 |
| | * $6f\ ^2F^0_{5/2} \longrightarrow 6p^2\ ^2D_{5/2}$ | 718.7 |
| | $8s\ ^2S_{1/2} \longrightarrow 7p\ ^2P^0_{1/2}$ | 679.0 |
| | ★ $7p\ ^2P^0_{1/2} \longrightarrow 7s\ ^2S_{1/2}$ | 666.0 |
| | * $9p\ ^2P^0_{1/2} \longrightarrow 8s\ ^2S_{1/2}$ | 655.8 |
| | * $9p\ ^2P^0_{3/2} \longrightarrow 8s\ ^2S_{1/2}$ | 631.1 |

\* INDICATES $^1S_0$ He METASTABLE ONLY

★ REACTION MAY ALSO OCCUR WITH Ne METASTABLE

FIG. 2D

| ACTIVE MEDIUM | ION LASER TRANSITION PUMPED BY HELIUM METASTABLE | $\lambda$ |
|---|---|---|
| LEAD, Pb II | * $9p\ ^2P^0_{3/2} \longrightarrow 6p^2\ ^2D_{5/2}$ | 622.9 nm |
|  | ★ $7p\ ^2P^0_{1/2} \longrightarrow 6p^2\ ^4P_{1/2}$ | 604.1 |
|  | $7d\ ^2D_{3/2} \longrightarrow 7p\ ^2P^0_{3/2}$ | 587.6 |
|  | ★ $7p\ ^2P^0_{3/2} \longrightarrow 7s\ ^2S_{1/2}$ | 560.8 |
|  | $7d\ ^2D_{5/2} \longrightarrow 7p\ ^2P^0_{3/2}$ | 554.4 |
|  | $5f\ ^2F^0_{7/2} \longrightarrow 6p^2\ ^4P_{5/2}$ | 537.2 |
|  | $5f\ ^2F^0_{5/2} \longrightarrow 6p^2\ ^4P_{5/2}$ | 536.7 |
|  | ★ $7p\ ^2P^0_{3/2} \longrightarrow 6p^2\ ^4P_{1/2}$ | 516.3 |
|  | * $6f\ ^2F^0_{5/2} \longrightarrow 6p^2\ ^2D_{3/2}$ | 504.9 |
|  | $7d\ ^2D_{3/2} \longrightarrow 7p\ ^2P^0_{1/2}$ | 504.2 |
|  | * $7p\ ^2P^0_{1/2} \longrightarrow 6p^2\ ^2D_{3/2}$ | 468.4 |
|  | * $7p\ ^2P^0_{3/2} \longrightarrow 6p^2\ ^2D_{3/2}$ | 455.7 |
|  | $8p\ ^2P^0_{3/2} \longrightarrow 6p^2\ ^4P_{5/2}$ | 447.6 |
|  | $5f\ ^2F^0_{5/2} \longrightarrow 6d\ ^2D_{3/2}$ | 438.6 |
|  | $5f\ ^2F^0_{7/2} \longrightarrow 6d\ ^2D_{5/2}$ | 424.5 |
|  | $5f\ ^2F^0_{5/2} \longrightarrow 6d\ ^2D_{5/2}$ | 424.2 |
|  | * $9s\ ^2S_{1/2} \longrightarrow 7p\ ^2P^0_{3/2}$ | 415.2 |
|  | $5f\ ^2F^0_{5/2} \longrightarrow 6p^2\ ^4P_{3/2}$ | 378.5 |
|  | $8p\ ^2P^0_{3/2} \longrightarrow 6d\ ^2D_{3/2}$ | 377.2 |
|  | * $9s\ ^2S_{1/2} \longrightarrow 7p\ ^2P^0_{1/2}$ | 371.8 |
|  | * $8d\ ^2D_{5/2} \longrightarrow 7p\ ^2P^0_{3/2}$ | 371.4 |
|  | * $6p^2\ ^2S_{1/2} \longrightarrow 7p\ ^2P^0_{3/2}$ | 369.9 |

* INDICATES $^1S_0$ He METASTABLE ONLY
★ REACTION MAY ALSO OCCUR WITH Ne METASTABLE

FIG. 2E

| ACTIVE MEDIUM | ION LASER TRANSITION PUMPED BY HELIUM METASTABLE | $\lambda$ |
|---|---|---|
| LEAD, Pb II | $8p\ ^2P^0_{3/2} \longrightarrow 6d\ ^2D_{5/2}$ | 366.5 nm |
| | $6p^2\ ^2P_{3/2} \longrightarrow 7p\ ^2P^0_{3/2}$ | 364.9 |
| | $*\ 8d\ ^2D_{3/2} \longrightarrow 7p\ ^2P^0_{1/2}$ | 345.5 |
| | $8p\ ^2P^0_{1/2} \longrightarrow 6p^2\ ^4P_{3/2}$ | 345.3 |
| | $*\ 6f\ ^2F^0_{7/2} \longrightarrow 6p^2\ ^4P_{5/2}$ | 345.1 |
| | $*\ 6f\ ^2F^0_{5/2} \longrightarrow 6p^2\ ^4P_{5/2}$ | 345.0 |
| | $*\ 6p^2\ ^2S_{1/2} \longrightarrow 7p\ ^2P^0_{1/2}$ | 335.0 |
| | $6p^2\ ^2P_{3/2} \longrightarrow 7p\ ^2P^0_{1/2}$ | 330.9 |
| | $*\ 6f\ ^2F^0_{5/2} \longrightarrow 6d\ ^2D_{3/2}$ | 301.6 |
| | $*\ 6f\ ^2F^0_{7/2} \longrightarrow 6d\ ^2D_{5/2}$ | 294.8 |
| | $*\ 6f\ ^2F^0_{5/2} \longrightarrow 6d\ ^2D_{5/2}$ | 294.7 |
| | $8p\ ^2P^0_{1/2} \longrightarrow 7s\ ^2S_{1/2}$ | 280.5 |
| | $*\ 9p\ ^2P^0_{3/2} \longrightarrow 6d\ ^2D_{5/2}$ | 277.2 |
| | $8p\ ^2P^0_{3/2} \longrightarrow 7s\ ^2S_{1/2}$ | 271.7 |

\* INDICATES $^1S_0$ He METASTABLE ONLY
★ REACTION MAY ALSO OCCUR WITH Ne METASTABLE

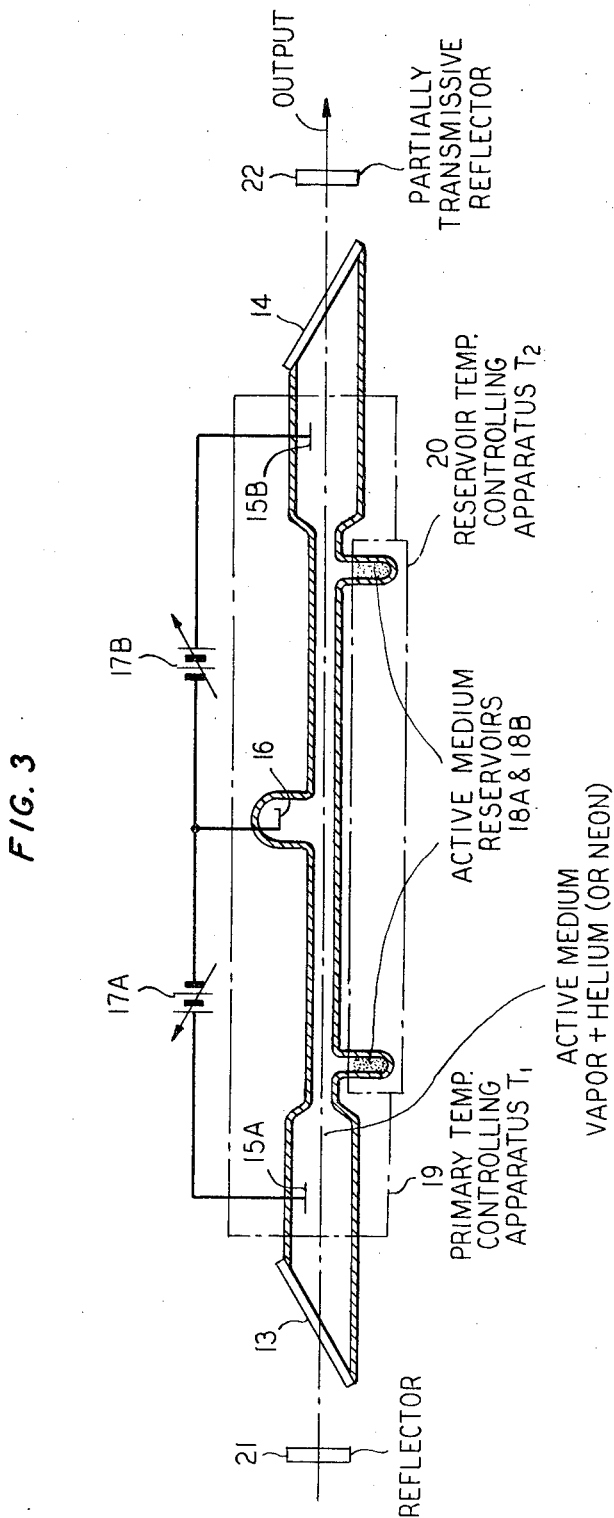

ION LASERS EMPLOYING GAS MIXTURES

REFERENCE TO RELATED APPLICATION

This application is a continuation-in-part of my copending application, Ser. No. 759,922, filed Sept. 16, 1968, and now abandoned.

BACKGROUND OF THE INVENTION

This invention relates to ion lasers employing gas mixtures.

The recent development of coherent light amplifiers and oscillators, now generally referred to as lasers, has made feasible a variety of new uses and applications of electromagnetic wave energy in the infrared, visible and ultraviolet portions of the spectrum. Light waves produced by such devices can be very sharply focused to produce energy densities suitable for welding, cutting, drilling and similar purposes. Among the most promising applications of coherent light are those in the field of communications where available bandwidth can be greatly increased by use of a source of carrier frequency much higher than those carrier frequencies presently in use.

It may be noted that ultraviolet frequencies are the highest frequencies presently contemplated for future optical communication use; and such frequencies, corresponding to wavelengths shorter than 400 nm., provide proportionally higher communication bandwidth than do lower optical frequencies. That fact notwithstanding, lasers at visible frequencies provide greater bandwidth than infrared laser frequencies and, because of their visibility, are simpler to adjust and use than are either ultraviolet and infrared lasers.

The search for visible and ultraviolet lasers of adequate power level for the intended uses, in either pulsed or continuous-wave operation, has produced relatively few attractive candidates. Typical of such lasers are the argon ion lasers and neon ion lasers, all of which have quantum efficiencies less than 7 percent and have relatively severe limitations on output power. Such limitations may be serious drawbacks for many communication applications. Thus, it would be desirable to have a number of visible and ultraviolet lasers of substantially greater power and preferably, greater quantum efficiency. Quantum efficiency is 100 times the ratio of the laser photon energy to the energy separation of the upper laser level from the natural atom ground state.

It will be noted that, in the ion lasers mentioned above, the excitation of the active ion occurs by direct electron impact with the ions. In other lasers, direct electron impact is so inefficient as to permit only relatively weak, pulsed operation.

While mixtures including auxiliary exciting gases such as helium, neon or nitrogen or including buffer gases such as helium or neon have proved useful in many visible and infrared lasers, such mixtures have not typically been considered advantageous in ion lasers, particularly ultraviolet ion lasers. Auxiliary exciting gases have heretofore been employed in resonant energy transfer in which an excited level of the auxiliary gas matches the upper laser level of the lasing gas or as buffer gases to enable the so-called electron temperature, or electron kinetic energy, of the discharge to be raised.

The reasons that these mechanisms of gas mixtures have not been found useful in prior ion lasers is that, in the case of the fist mechanism, the incidence of energy level matching close enough for resonant energy transfer is rather low, or at least such matching is extremely difficult to find. In the case of the second mechanism, increased electron temperature in the typical ion laser, such as the argon ion laser, tends to produce undesired population of the lower laser level.

Accordingly, it is desirable to have a number of ion lasers which avoid all these disadvantages.

SUMMARY OF THE INVENTION

My invention is based on my discovery of the nature of the excitation mechanism in the previously known visible laser at 441.6 nm. in ionized cadmium vapor mixed with helium gas. My experiments show that an energy transfer occurs through the reaction $$He^* + Cd \rightarrow (Cd^+)^* + He + e^- + K.E. \quad (1)$$

where $He^*$ is a helium atom in its metastable state and $(Cd^+)^*$ is the cadmium ion excited to the upper laser level of the 441.6 nm. transition. The transfer differs from a resonant transfer in the usual sense because the free electron carries off the excess energy of the $He^*$ metastable atom, that is, the portion of its released energy exceeding the quantum needed for exciting the cadmium ion to the upper laser level.

According to a principal feature of my invention, such energy transfers from metastable helium or neon atoms are employed in other ion lasers in which the lasing gases are vapors of cadmium, zinc, magnesium, aluminum, gallium, indium, thallium, beryllium, germanium, tin or lead in the first ionized states of those elements. It is characteristic of this feature of my invention that the Penning collision excited laser action occurs only over a limited partial pressure region corresponding to a vapor source temperature variation of approximately ±4 percent in terms of absolute temperature above and below the temperature at which the maximum laser output occurs. In the new cadmium vapor laser and in certain other species, ultraviolet laser action is promoted by providing appropriate end windows on the gas tube and by disposing the tube in a resonator adapted for resonating the particular wavelength of interest.

Continuous-wave lasing action based on the foregoing principle has been observed at 325 nm. in the ultraviolet in singly ionized cadmium, at 645.3 nm. and 684.4 nm. in the visible in singly ionized tin, and at 747.9 nm. in the infrared in singly ionized zinc. (1 nm. =1=109 meters =10 A.) Lasing action has occurred in the helium-metal vapor discharges at helium pressures of several Torr and at much lower partial pressures of the metal vapor, e.g., about three orders of magnitude lower partial pressure. Temperatures adequate to maintain the metal vapor are supplied by heated reservoirs and sufficient power levels of the discharge.

The 325 nm. ultraviolet laser in singly ionized cadmium is the first continuous-wave ultraviolet laser that can be built and operated with relatively simple techniques, similar to those used in helium-neon lasers.

BRIEF DESCRIPTION OF THE DRAWING

Other features and advantages of my invention will become apparent from the following detailed description taken together with the drawing, in which:

FIG. 1 is a partially pictorial and partially schematic illustration of an embodiment of the invention;

FIGS. 2A through 2E are tables of laser lines obtainable in accordance with my invention; and FIG. 3 is a partially pictorial and partially schematic illustration of a modification of the embodiment of FIG. 1.

DESCRIPTION OF ILLUSTRATIVE EMBODIMENTS

In the laser of FIG. 1, the gas mixture including the active medium vapor and helium or neon is contained in a quartz or pyrex ® tube 12 with quartz Brewster-angle end windows 13 and 14. The tube 12 has an internal diameter of about 5 millimeters in its narrower portion, which extends throughout most of the discharge length of tube 12.

Pumping power is supplied to the tube through electrical discharge apparatus including the anode 15 and cathode 16 in widened end portions of tube 12 and including the DC voltage source 17 connected in the conventional polarity between anode 15 and cathode 16.

The side cups 18A through 18E, which are appendages of tube 12, form reservoirs for the solid or liquid form of the active medium. Although but such reservoirs are shown, the actual number depends on the length of tube 12, since the reservoirs are preferably spaced about every 5 to 20 centimeters along tube 12.

The laser tube 12 including the end windows 13 and 14 is enclosed in a primary temperature-controlling apparatus 19, which is designed to maintain the active medium within the central portion of tube 12 in the vapor state at a sufficiently high temperature to have the desired concentration of atoms and the desired vapor pressure. Thus the temperature control apparatus 19 is typically an oven or furnace formed by a resistive heating tape wound closely around the apparatus from end to end, without covering the end windows, or by another heated enclosure. Deposition of cooled metal upon the end windows has not been found to be a problem, even when they are slightly cooler than the remainder of tube 12.

To maintain a liquid or solid form of the active medium in the reservoirs formed by side cups 18A through 18E, a reservoir temperature-controlling apparatus 20 maintains a lower temperature, $T_2$, than the temperature, $T_1$, in apparatus 19. In general, I have found that special measures to achieve thermal isolation between the temperature-controlling apparatuses 19 and 20 are unnecessary. For example, in high power discharges, the temperature gradient occurring at different physical distances from the discharge axis is found to be sufficient to maintain an adequate vapor pressure of the material in the reservoir. It may occasionally be desirable to employ variable separate temperature control, as shown.

To complete a laser oscillator, an optical resonator is formed by disposing ultraviolet reflectors 21 and 22 on the axis of tube 12 in an opposed relationship. It should be appreciated that lasers according to my invention may be used as coherent light amplifiers in the absence of any resonator, in which case, reflectors 21 and 22 can be eliminated. It may also be appreciated that reflectors 21 and 22 could be curved to provide focusing of the coherent radiation and thereby reduce diffraction losses. Typically, reflector 22 will be adapted to be partially transmissive.

In the discussion of the tables of FIGS. 2A through 2E, the appropriate reflectors 21 and 22 will generally be multiple-layer dielectric coating of one-fourth wavelength thickness at the particular wavelength of interest. The techniques for making laser reflectors with multiple-layer dielectrics are now well known in the art.

With respect to the following discussion of the different laser lines mentioned in the tables of FIGS. 2A through 2E, it should also be noted that the Brewster angle of the end windows is somewhat different, although usually not critical, for each of the different wavelengths. In general, the end windows 13 and 14 will make a smaller angle with respect to the axis of tube 12 in the ultraviolet lasers than in visible or infrared lasers. Highly pure optical quality quartz is one of the few materials that is suitable for use in windows 13 and 14 at ultraviolet wavelengths.

As may be seen from FIGS. 2A through 2E, the active medium in each of the lasers of my invention, is an ionized vapor of at least one of the metallic elements, cadmium, zinc, magnesium, aluminum, gallium, indium, thallium, beryllium, germanium, tin and lead. The Roman numeral II after the chemical symbol in the tables indicates that the second emission spectrum includes the lasing transitions. The second emission spectrum is obtained from the first ionized state of an element.

For most of the lines set forth in FIGS. 2A through 2E, the auxiliary exciting gas in the mixture within tube 12 is helium, since, in general, it is only metastable levels of helium which are capable of nonresonately populating the upper laser levels of the ultraviolet transitions. Indeed, in some cases only the most energetic helium metastable level, $1s_0$, is capable of populating the upper laser level. In a few cases at the other extreme energywise, the metastable level of neon is adequate for nonresonant excitation. The vapor pressure of the various metals in the tube bore where laser action occurs is determined by the temperature of the metal in the reservoirs. The necessary vapor pressure is in the range of $10^{14}$ Torr to 1 Torr which is defined by the specific temperature range given for each metal in FIGS. 2A through 2E, that range being nevertheless limited by the principle that the vapor source temperature vary within approximately ±4 percent in terms of absolute temperature above and below the temperature at which the maximum laser output occurs.

Moreover, in nearly every case, it is believed to be advantageous to use a single isotope of the metallic material. The use of a single isotope provides a much lower threshold for continuous-wave operation and also provides a higher efficiency than the naturally occurring isotope mixture. The efficiency is defined as the power input divided by power output.

For example, my initial studies of the visible laser line of ionized cadmium (Cd II) at 4416 A. using naturally occurring Cd, showed that continuous-wave laser action was obtained with a current threshold of 40 milliamperes and a gain of 4 percent to 5 percent per meter in a 5-millimeter bore, 1 meter long tube, using 2 Torr of helium as the exciting gas. It was thereafter found that the use of a single isotope increased the gain by a factor of about four, which is the reciprocal of the relative proportion of the most abundant isotope in naturally occurring cadmium. Specifically, I found that the gain increased to about 20 percent per meter at currents in the range of 60 milliamperes. Such a several-fold increase may be expected to occur in all the following examples where the shift of laser wavelength with the isotope used is greater than the Doppler width of the laser line. The overall efficiency, without any attempt at optimization, was 0.02 percent which is competitive with the argon 4880 A. laser.

My discovery of the nature of the excitation mechanism in the cadmium vapor-helium laser operating at 4416 A. is based upon the following specific findings.

The variation of laser output with helium partial pressure showed a rather sharp maximum at 2-Torr helium pressure and a gradual decline toward higher helium pressures. Also, at higher helium pressures, the laser output saturates at lower currents than at 2-Torr helium pressures. Moreover, the 4416 A. transition would not lase with either neon or nitrogen as auxiliary gases in place of helium; but it would operate weakly with as much as one part neon to 15 parts helium in a three-gas helium-neon-metal vapor mixture. The excitation mechanism in that laser is therefore shown to be very much dependent on helium as an auxiliary gas.

Moreover, I observed a nearly linear dependence of laser intensity on discharge current. The saturation beginning at 100 milliamperes was apparently not due to an inherent limiting process of the laser system but was instead due to discharge heating effects which changed the vapor pressure at higher currents. Careful experimental technique, including careful control of the temperature, $T_2$, of the reservoir is expected to eliminate the experimental effect of variations in metal vapor pressure with discharge current.

These experiments virtually rule out direct electron impact as the excitation mechanism because of the relatively high helium pressures needed for maximum continuous-wave laser output. The preliminary data indicates that the most probable excitation mechanism is that of a Penning-type reaction, first found in classical ionization cross section studies, in which a helium metastable atom collides with a neutral cadmium atom and ionization, as shown in the following relationship, occurs:

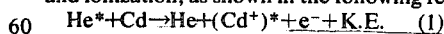
$$\text{He}^* + \text{Cd} \rightarrow \text{He} + (\text{Cd}^+)^* + e^- + \text{K.E.} \quad (1)$$

The cadmium is left in an excited ionized state and the excess energy is taken up by the emitted electron.

The foregoing excitation mechanism described by Equation (1) has heretofore not been known to exist in lasers nor has it ever been proposed before for use in lasers.

It is one aspect of my invention that I have recognized that this excitation mechanism makes feasible many other relatively efficient ion laser primarily in the visible and ultraviolet regions of the spectrum.

For the helium metastables may also populate the cadmium $5s^2\ ^2D_{3/2}$, $6s\ ^2S_{1/2}$ and the $5d^2D_{5/2, 3/2}$ levels which could give laser action in the ultraviolet at 325.0 nm., 274.8 nm., 231.2 nm. and 219.4 nm. The last two transitions result from the $5d\ ^2D$ levels, which are above the $\text{He}^3S_1$ metastable level. These laser lines are shown in the table of FIGS. 2A along with another likely line at 257.2 nm., which would result from the cadmium $6s\ ^2S_{1/2} \rightarrow 5p\ ^2P^0_{3/2}$ transition. Which of these transitions lases in the apparatus of FIG. 1 depends upon the particular choice of resonator mirrors.

More specifically, in the 325 nm. ultraviolet laser employing singly ionized cadmium, a temperature $T_1$ on the axis of the tube 12 is typically maintained in excess of the reservoir temperature $T_2$, and the reservoir temperature $T_2$ is maintained in the range from 230° C. to about 300° C., depending on the other parameters of the system. Typically, a 50° C. difference in temperature is maintained between $T_1$ and $T_2$, although this relationship is not critical.

To complete a laser oscillator, an optical resonator is formed by disposing reflectors 21 and 22 on the axis of tube 12 in an opposed relationship. For the 325 nm. ultraviolet cadmium laser, reflectors 21 and 22 are multiple-layer dielectric reflectors providing substantially greater reflectivity at 325 nm. than at 441.6 nm. Windows 13 and 14 are highly pure optical quality quartz.

The 325 nm. transition in single-ionized cadmium is the most interesting of the new transitions in that it is the first CW laser in the ultraviolet that can be built and operated with relatively simple techniques, similar to those used in Ne-Ne lasers. The maximum gain observed was approximately 3 percent—4 percent in a 1-meter discharge tube with a 4 mm. bore at a discharge current of approximately 150 ma., using a single isotope of $Cd^{114}$. The power output was approximately 6 mw. although this was not optimized as mirrors were not available to adjust for maximum power output. Maximum gain occurs at a Cd partial pressure of approximately $3\times10^{13}$ Torr (the optimum partial pressure increases with current due to the nature of the excitation process) and a He pressure of 3.5 Torr, although the laser also oscillates at higher He pressures, as in the 441.6 nm. transition. The upper laser level density increases linearly with current provided the Cd vapor density can be held constant. This linearity has been observed for currents up to 100 ma. The principle excitation mechanism is that of the Penning collision, as described above. The helium metastable atoms populate the ionized cadmium $5S^2\ ^2D_{3/2}$ level in order to establish the population inversion for the 325 nm. transition.

Similarly, the same excitation mechanism is applicable in mixtures of helium and zinc vapor. The ionized zinc, symbol Zn II, has energy levels populatable by helium or neon metastable atoms as follows:

| Active medium | Ion laser transition pumped by helium metastable | λ, nm. |
| --- | --- | --- |
| Zinc, Zn II, 200° C.-400° C. | $5s\ ^2S_{1/2} \rightarrow 4p\ ^2P^0_{1/2}$* | 250.2 |
| | $5s\ ^2S_{1/2} \rightarrow 4p\ ^2P^0_{3/2}$* | 255.8 |
| | $4s^2\ ^2D_{3/2} \rightarrow 4p\ ^2P^0_{1/2}$ | 589.4 |
| | $4s^2\ ^2D_{3/2} \rightarrow 4p2P^0_{3/2}$ | 621.4 |
| | $4s^2\ ^2D_{5/2} \rightarrow 4p\ ^2P^0_{3/2}$ | 747.9 |

*Indicates $^1S_0$ He metastable only.

The first two levels can be populated only by the $I_S$ level of helium, which is its highest metastable level. The resulting laser transitions are indicated in the table 2A and have wavelengths, respectively, 250.2 nm., 255.8 nm. and the visible wavelengths 589.4 nm. and 621.4 nm., and near infrared wavelength 747.9 nm.

The latter laser line has been observed by me to oscillate continuous-wave when mixed with helium having a 2-Torr partial pressure.

The 747.9 nm. laser transition in singly ionized zinc corresponds to the 441.6 nm. transition in singly ionized cadmium. Laser output peaks at approximately the same partial pressure of Zn (320° C.; $4\times10^{13}$ Torr) as that of Cd for the 441.6 nm. and 325 nm. transitions (240° C.; $3\times10^{13}$ Torr). Optimum He pressure was approximately 4 Torr but laser action occurred over a range of from 2 to 10 Torr. The gain was 2 percent in a 1 meter long, 5 mm. bore discharge tube at a current of 80 ma. The threshold current was approximately 50 ma. and laser output increased linearly up to 100 ma. Discharge currents above 100 ma. were not investigated.

As shown in FIGS. 2B through 2E, the new transitions in tin and lead, made feasible with the technique according to my invention, are extremely numerous. Indeed several of them may be excited by neon metastable levels in mixtures of tin or lead vapor with neon, as indicated by the solid stars. Sit will also be noted that many of these transitions are visible transitions and are therefore very promising for a wide variety of communication, medical and general scientific applications.

In particular, I have observed the two starred transitions of tin in the table of FIG. 2B to oscillate continuous-wave in an embodiment of my invention. Moreover, these tin-helium lasers have operating characteristics similar to the cadmium-helium laser at 441.6 nm. It is therefore felt that they give strong confirmation to the generalization of the excitation mechanism scheme of Equation (1) above in applying it to other systems.

The two continuous-wave transitions in singly ionized tin (Sn) are of great interest in that they indicate that the Penning process can be applied to a different type of energy level structure than that of the Cd system. Both transitions occur between energy levels well below the He metastable levels and they share the same lower level. The $3/2 \rightarrow 1/2$ transition at 645.3 nm. is the stronger transition and has a threshold current of approximately 30 ma. at a Sn partial pressure of $1.5\times10^{1a3}$ Torr (corresponding to a temperature of 1100° C. for the Sn metal vapor source), and an optimum He pressure of 8 Torr in a 75 cm. long—5 mm. bore discharge tube. Laser power increased approximately linearly with discharge current up to a current of 100 ma. A further increase in current was not attempted due to the temperature limitations of the quartz discharge tube. Laser action began at a temperature of 1020° C. and increased approximately linearly with increasing Sn partial pressure until it began to saturate at a temperature of 1100° C. as mentioned above (a further increase in temperature was restricted due to the quartz). Laser action occurred over a pressure range of 3 Torr to 12 Torr He with the maximum output occurring at approximately 8 Torr (pressures higher than 12 Torr were not investigated). The gain at a vapor temperature of 1100° C. and a He pressure of 8 Torr at a current of 80 ma. was approximately 2 percent—3 percent in the 75 cm. effective discharge length.

Laser action on the 684.4 nm. transition was not investigated in detail but had considerably lower gain and required a threshold current of approximately 80 ma. Mirrors with a high reflectivity at 684.4 nm. and a low reflectivity at 645.3 nm. are desirable for this line but were not available to do an independent study of the 684.4 nm. laser properties. Naturally occurring Sn has a mixture of many isotopes but the isotope shifts are much less than the Doppler width (1100 MHz. at 1100° C.) on these transitions. Thus, the use of a natural isotope mixture does not limit the laser gain as it does in the Cd laser transitions.

The predominant role of the Penning collision process in exciting the 441.6 nm. and 325 nm. transition in singly ionized cadmium has already been established. The suggestion that this process is also the dominant excitation mechanism in the 645.3 nm. and 684.4 nm. laser transitions in singly ionized tin, and the 747.9 nm. laser transition in singly ionized zinc is based on the agreement of their laser characteristics with the following general characteristics of Penning excited ion levels;:

1. The process inherently produces a rather sharp excitation coupling, or resonance, to the various ion levels over a small range of partial pressures of the metal vapor. The term resonance is not used here in the sense of an energy level match, but rather in the sense of a ready transfer of energy, peaked at appropriate parameter values. Thus, laser action will occur over only a limited partial pressure region corresponding to a vapor source temperature variation of approximately ±4 percent (°K.) above and below the temperature where the maximum laser output occurs.

2. The Penning excited ion level densities will increase linearly with discharge current until a current level is reached where the He triplet metastable density begins to saturate (the singlet He metastable density saturates at a much lower current level than the triplet density but the Penning excited ion levels generally follow the triplet density since it is usually much larger in a normal discharge than that of the singlet) As a consequence, laser output varies linearly with current until the triplet density saturates (usually well above 100 ma.).

3. The He triplet metastable density, in a 4 mm. bore discharge, reaches a maximum at a He density corresponding to a pressure of approximately 3.5 Torr at a gas temperature of 240° C. (where maximum laser action occurs in the Cd blue and ultraviolet lasers). This same density (using Charles law) corresponds to a pressure of approximately 4 Torr at a gas temperature of 320° C. (the experimentally observed maximum of the Zn II 747.9 nm. laser transition) and a pressure of 8 to 9 Torr at a gas temperature of 1100° C. (the experimentally observed maximum of the Sn laser transitions).

Magnesium and aluminum provide some of the most desirable laser lines according to my invention, since those indicated with solid stars in the table 2A can occur in mixtures in which the exciting gas is neon excited to its metastable level.

New laser lines in gallium and indium are made feasible with the new excitation mechanism in mixtures with helium gas, as shown in the table of FIG. 2A.

In thallium, beryllium, and germanium, those new transitions which can be excited only by the upper helium metastable level are indicated by asterisks in the table of FIG. 2B. It will be noted that three of the transitions are preferred in the sense that they may also be populated by the lower helium metastable level; and thus they can be expected to be the most powerful.

In the modified laser of FIG. 3, a balanced excitation scheme, which keeps the windows clean and facilitates increased current levels, is employed. The gas mixture including the active medium vapor and helium or neon is contained in a quartz or pyrex® tube 12 with quartz Brewster-angle end windows 13 and 14. The tube 12 has an internal diameter of from 3 to 5 mm. in its narrower portion, which extends throughout most of the discharge length of tube 12.

Pumping power is supplied to the tube through electrical discharge apparatus including the anodes 15A and 15B in widened end portions of tube 12 and cathode 16 midway along the tube and including the adjustable DC voltage sources 17A and 17B connected in the conventional polarity between anodes 15A and 15B and cathode 16.

The side cups 18A and 18B, which are appendages of tube 12, form reservoirs for the solid or liquid form of the active medium. These reservoirs are spaced axially from the anodes toward the cathode by a distance of approximately 2 centimeters, as taught in the copending patent application of T. P. Sosnowski, Ser. No. 814,617 (Case 1), filed Apr. 9, 1969, and assigned to the assignee hereof, so that the windows are kept clear and a substantially uniform metal vapor distribution between the reservoirs is maintained in the presence of cataphoresis.

The laser tube 12 including the end windows 13 and 14 is enclosed in a primary temperature-controlling apparatus 19, which is designed to maintain the active medium within the central portion of tube 12 in the vapor state at a sufficiently high temperature to have the desired concentration of atoms and the desired vapor pressure. Thus the temperature control apparatus 19 is typically an oven or furnace formed by a resistive heating tape wound closely around the apparatus from end to end, without covering the end windows, or formed by another heated enclosure. Alternatively, with just two reservoirs, a sufficiently intense discharge can fulfill this function.

To provide a sufficient vapor pressure of the metal from the pellets thereof disposed in the reservoirs formed by side cups 18A and 18B, a reservoir temperature-controlling apparatus 20 maintains a temperature, $T_2$, lower than the temperature $T_1$ in apparatus 19, about 50° C. lower than $T_1$. Nevertheless I have found that special measures to achieve thermal isolation between the temperature-controlling apparatuses 19 and 20 are unnecessary. For example, in high power discharges, the temperature gradient occurring at different physical distances from the discharge axis is found to be sufficient to maintain the desired vapor pressure of the material in the reservoir. It may occasionally be desirable to employ variable separate temperature control, as shown.

In other respects pertinent to the present invention, the operation of the embodiment of FIG. 3 is similar to that of FIG. 1. Its ability to facilitate higher current levels and output power levels ought to be particularly useful.

I claim:

1. Apparatus for the stimulated emission of radiation, comprising means forming a region in which the stimulated emission of radiation may occur, means including discharge pumping apparatus for providing in said region metastable atoms of one of the gases selected from the group consisting of helium and neon, means for providing a vapor of an element ($\Phi$) in said region, said element being selected from the group consisting of zinc, magnesium, aluminum, gallium, indium, thallium, beryllium, germanium, tin and lead and participating substantially in one of the reactions $$He^* + \Phi \rightarrow (\Phi^+)^* + He + e^1 + \text{kinetic energy, and}$$
$$Ne^* + \Phi \rightarrow (\Phi^+)^* + Ne + e^1 + \text{kinetic energy,}$$

where $(\Phi^+)^*$ is the upper energy level of a radiative transition in an ion of said element, said vapor providing means producing a source temperature of the vapor within approximately ±4 percent in terms of absolute temperature above and below the temperature at which maximum laser output occurs, means for stimulating said radiative transition to provide stimulated emission of radiation, and means for extracting a portion of said radiation from said region.

2. Apparatus according to claim 1 in which element ($\Phi$) is selected from the group consisting of zinc, magnesium, aluminum, gallium, indium, thallium, beryllium, tin and lead, where $(\Phi^+)^*$ is the upper energy level of an ultraviolet radiative transition of an ion of said element, and the stimulating means is a resonator adapted to resonate ultraviolet radiation from said transition.

3. Apparatus for the stimulated emission of radiation, comprising means forming a region in which the stimulated emission of radiation may occur, means including discharge pumping apparatus for providing metastable helium atoms (He*) in said region, means for providing a vapor of an element ($\Phi$) in said region, said element participating substantially in the reaction $$He^* + \Phi \rightarrow (\Phi^+)^* + He + e^1, + \text{kinetic energy}$$

where $(\Phi^+)^*$ is the upper energy level of an ultraviolet radiative transition in said element, the element being selected from the group consisting of cadmium, zinc, magnesium, aluminum, gallium, indium, thallium, beryllium, tin and lead, said vapor providing means producing a source temperature of the vapor within approximately ±4 percent in terms of absolute temperature above and below the temperature at which maximum laser output occurs, means for stimulating said ultraviolet radiative transition to provide stimulated emission of ultraviolet radiation, and means for extracting a portion of said ultraviolet radiation from said region.

4. Apparatus according to claim 1 in which the means forming a region includes a plurality of reservoirs for said metal, said reservoirs being spaced along said forming means.

5. Apparatus for the stimulated emission of radiation, comprising means forming a region in which the stimulated emission of radiation can occur, an auxiliary gas comprising helium contained within said forming means, a pair of reservoirs opening into said forming means and containing cadmium in vaporizable form, means for heating said reservoirs to a temperature of at least 230° C. to vaporize cadmium into said auxiliary gas, said temperature promoting Penning collision interaction with metastable atoms of said helium, means for supplying a discharge in the auxiliary gas and the vaporized cadmium to singly ionize the cadmium via said Penning collision interaction, said discharge having a current value helping to maintain the cadmium vapor in said region within a temperature variation from approximately 230° C. to approximately 260° C. to sustain said Penning collision interaction, means for stimulating the emission of coherent radiation from said cadmium at 325 nm. in the ultraviolet, including means for extracting a portion of said radiation.

6. Apparatus according to claim 5 in which the stimulating means comprises an optical resonator including reflectors having substantially greater reflectivity at 325 nm. than at 441.6 nm. in the visible region of the spectrum.

7. A Penning collision excited gaseous ion laser comprising a laser tube containing at least approximately 2 Torr of helium gas, means including at least one cadmium reservoir connected to said tube to supply vapor into said tube at a temperature at least as great as approximately 230° C., means for supplying a discharge in the helium gas and the vaporized cadmium to promote Penning collisions therebetween and to maintain the temperature of said cadmium vapor not greater than approximately 260° C., and an optical resonator aligned with the axis of said tube and including reflectors selected to sustain laser oscillation at 325 nm. in the ultraviolet.

8. A Penning collision excited gaseous ion laser comprising a laser tube containing at least approximately 4 Torr of helium gas, means including at least one zinc reservoir connected to said tube to supply zinc vapor into said tube at a temperature of at least approximately 290° C., means for supplying a discharge in the helium gas and the vaporized zinc to promote Penning collisions therebetween and to maintain the temperature of said zinc vapor not greater than approximately 345° C., and an optical resonator aligned with the axis of said tube and including reflectors selected to sustain laser oscillation at 747.9 nm.

9. A Penning collision excited gaseous ion laser comprising a laser tube containing at least approximately 8 Torr of helium gas, means including at least one tin reservoir connected to said tube to supply tin vapor into said tube at a temperature of approximately 1045° C., means for supplying a discharge in the helium gas and the vaporized tin to promote Penning collisions therebetween and to maintain the temperature of said zinc vapor not greater than approximately 1155° C., and an optical resonator aligned with the axis of said tube and including reflectors selected to support laser oscillations at 645.3 nm.

10. A Penning collision excited gaseous ion laser comprising a laser tube containing at least approximately 8 Torr of helium gas, means including at least one tin reservoir connected to said tube to supply tin vapor into said tube at a temperature of approximately 1045° C., means for supplying a discharge in the helium gas and the vaporized tin to promote Penning collisions therebetween and to maintain the temperature of said zinc vapor not greater than 1155° C., and an optical resonator aligned with the axis of said tube and including reflectors selected to support laser oscillations at 684.4 nm.

UNITED STATES PATENT OFFICE
CERTIFICATE OF CORRECTION

Patent No. 3,585,524　　　　　　　　Dated June 15, 1971

Inventor(s)　William T. Silfvast

It is certified that error appears in the above-identified patent and that said Letters Patent are hereby corrected as shown below:

Column 1, line 45, change "natural" to --neutral--. Column 2, line 33, change "109 meters" to --$1 \times 10^{-9}$ meters--; line 72, change "but" to --five--. Column 3, line 38, change "coating" to --coatings--; line 66, change "$1_s$" to --$1_{S_0}$--; line 72, change "$10^{14}$" to --$10^{-4}$--. Column 4, line 68, change "laser" to --lasers--; line 70, after "For" insert --example,--; line 71, "3/2" should be on the same level as "5/2". Column 5, line 28, change "6 mw." to --6 mW--; line 31, change "$3 \times 10^{13}$" to --$3 \times 10^{-3}$--; line 50 (table), change "$D^{5/2}$" to --$D_{5/2}$--; line 56, change "$\ell_s$" to --$1_{S_0}$--; lines 68 and 69 change "$10^{13}$" to --$10^{-3}$--. Column 6, line 3, change "Sit" to --It--; line 24, change "$10_1^{1a3}$" to --$10^{-3}$--. Column 8, lines 23, 24 and 51, change "$e^1$" to --$e^-$--. Claim 4 should be canceled.

Signed and sealed this 9th day of November 1971.

(SEAL)
Attest:

EDWARD M. FLETCHER, JR.　　　ROBERT GOTTSCHALK
Attesting Officer　　　　　　　　Acting Commissioner of Patents

UNITED STATES PATENT OFFICE
CERTIFICATE OF CORRECTION

Patent No. 3,585,524               Dated June 15, 1971

Inventor(s) W. T. Silfvast

It is certified that error appears in the above-identified patent and that said Letters Patent are hereby corrected as shown below:

Claim 4 should be omitted, as advised at the top of page 4 of the amendment of October 9, 1970 (Amendment A).

Signed and sealed this 22nd day of February 1972.

(SEAL)
Attest:

EDWARD M. FLETCHER, JR.            ROBERT GOTTSCHALK
Attesting Officer                  Commissioner of Patents